April 1, 1958 H. W. PATTON 2,829,251
ELECTRONICALLY SWITCHED FILTER CIRCUIT
Filed Oct. 6, 1955
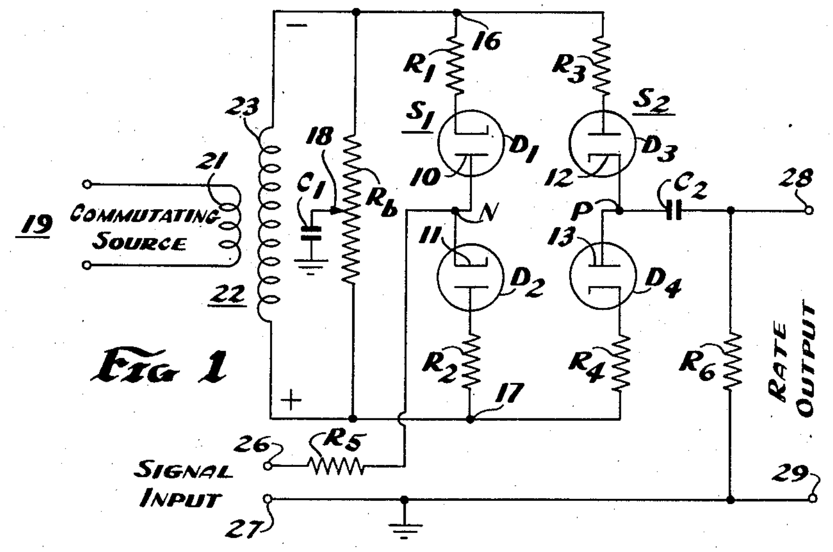
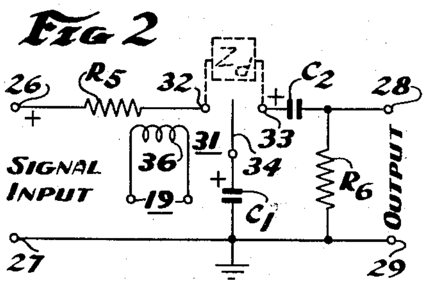
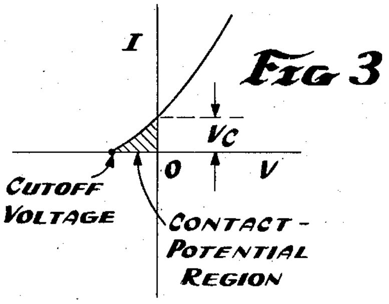
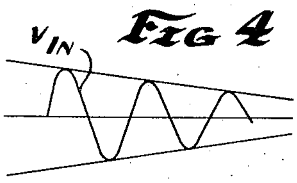
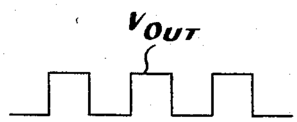
FIG 5
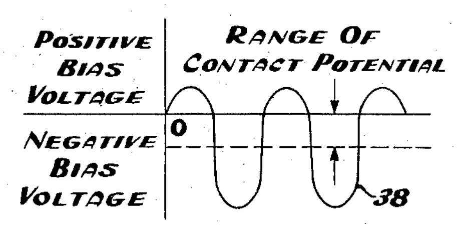
FIG 6
INVENTOR.
HENRY W. PATTON
BY Moody and Goldman
ATTORNEYS United States Patent Office 2,829,251
Patented Apr. 1, 1958

2,829,251

ELECTRONICALLY SWITCHED FILTER CIRCUIT

Henry W. Patton, Cedar Rapids, Iowa, assignor to Collins Radio Company, Cedar Rapids, Iowa, a corporation of Iowa Application October 6, 1955, Serial No. 538,995

3 Claims. (Cl. 250—27)

This invention relates generally to electronically switched filter circuits, and concerns particularly a type of electronically switched filter circuit that avoids certain difficulties previously obtained with filter circuits using conventional electronic switching means.

This invention pertains to a type of filter circuit generally used in servo-systems to stabilize their operation by preventing undue hunting and oscillation. This invention, in particular, concerns a type of filter circuit that requires single-pole double-throw switching means.

A filter circuit, of the type described herein, receives a varying input voltage, which may be a direct and/or alternating voltage, and provides an output that varies with the rate-of-change of the input signal. For example, when an alternating input signal of constant amplitude is provided, the filter circuit output will be zero.

Conventionally, the electronic switch has not operated well as the switching means for the present type of filter circuit because of the special switching requirements of this filter circuit. The electronic switch must provide an extremely high impedance during "open-circuit" conditions, and this impedance should preferably be of the order of one-hundred megohms or greater. The "Edison Effect" or "contact-potential," as it is sometimes called, lowers the impedance during "open-circuit" conditions in conventional electronic switches using vacuum tubes. Contact-potential results from the electron space charge that exists about the heated filament in a vacuum tube. The heated filament emits electrons at varying velocities. Some electrons have sufficient velocity to reach the adjacent electrodes, such as, the plate in a vacuum diode, when no plate voltage is applied and, also, even when small negative voltages are applied. Under these conditions, the electrons create a voltage, called contact-potential, across the electrodes, when the electrodes are open or are connected to a high impedance. Thus, while a small negative bias voltage is applied to a vacuum diode, some of the emitted electrons may provide a current path from cathode to plate; and, accordingly, small negative biasing voltages may not cause a high impedance "open-circuit" across a vacuum diode.

Contact-potential is, to a large extent, an unpredictable quantity for any particular vacuum tube. It varies from tube to tube and also varies during the life of any single tube. Generally, it is of the order of about one volt.

The invention avoids contact-potential difficulties by providing a circuit that switches with extreme speed through the contact-potential region of a diode to a large negative bias, that obtains an extremely high "open-circuit" impedance.

Vacuum diodes have characteristics that generally make them more advantageous in filter circuit electronic switches of the single-pole double-throw type than semi-conductor diodes, because vacuum diodes are, at this time, capable of obtaining much higher open-circuit impedances than are semi-conductor diodes. However, the invention may also be used with semi-conductor diodes to avoid a low-impedance "open-circuit" condition, that is also obtained with small negative bias voltages and, in some respects, causes resulting effects that are similar to the contact-potential of vacuum tubes. An additional difficulty with semi-conductor diodes is that there is a range of negative bias which provides optimum "open-circuit" conditions; and an increase of negative bias beyond this range decreases the "open-circuit" impedance. This invention provides a circuit which can maintain a semi-conductor diode at its optimum "open-circuit" impedance.

An example of a conventional switching circuit is the ring modulator that uses four diodes in a bridge arrangement. Such a ring modulator can utilize only relatively small commutating voltages to switch its diodes between "closed-circuit" and "open-circuit" states. Equal voltages are applied across each diode to obtain the "open-circuit" and "closed-circuit" states. Only small voltages can be used to avoid injecting undue amounts of commutating-voltage noise and to prevent exceeding the plate-current rating of some diodes. As a result, the "open-circuit" biasing voltage is small and may not exceed the contact-potential region. Accordingly, extremely large "open-circuit" impedances are difficult, if not impossible, to obtain with conventional ring modulator circuits.

The specific reason why extremely high "open-circuit" impedances are essential in filter circuits of the type used in this invention is that charge stored in filter circuit capacitors must not change, even in small amounts, during open-circuit conditions.

It is, therefore, an obejct of this invention to provide a particular type of a filter circuit that is operable with an electronic switch.

It is another object of this invention to provide an electronic switch for a filter circuit that avoids difficulty caused by the contact-potential of vacuum diodes.

It is still another object of this invention to provide an electronic switch for a filter circuit that can utilize a large commutating voltage for switching purposes that provides a large negative "open-circuit" bias but provides a small positive "closed-circuit" bias to the switching diodes.

It is yet another object of this invention to provide an electronic switch for a filter circuit that maintains extremely high impedances during open-circuit conditions and which does not inject a significant amount of noise into the output signal.

It is a further object of this invention to provide an electronic switch which is very fast acting and provides substantially equal intervals of time for both closed-circuit and open-circuit switching states.

Further objects, advantages and features of this invention will be apparent to a person skilled in the art upon further study of this invention.

Figure 1 illustrates one form of the invention;

Figure 2 shows a filter circuit having an electro-mechanical chopper instead of the electronic switch shown in Figure 1;

Figure 3 shows the plate-current plate-voltage characteristic of a typical vacuum diode;

Figure 4 shows a varying alternating-current input signal that may be provided to the invention;

Figure 5 shows the form of an output voltage provided by the invention, when it has the input voltage shown in Figure 4; and, Figure 6 is a diagram that illustrates the variation in bias voltage provided to each diode in the invention.

Figure 1 shows a specific form of the invention, which has a pair of diodes $D_1$ and $D_2$ connected in series; and a common point N connects to the plate 10 of diode $D_1$ and to the cathode 11 of diode $D_2$. A resistor $R_1$ is connected in series with the cathode of $D_1$; and a second resistor $R_2$ is connected in series with the plate of diode $D_2$.

In a similar manner, another pair of diodes $D_3$ and $D_4$ are connected in series; wherein a common point P connects to the cathode 12 of diode $D_3$ and to the plate 13 of diode $D_4$. Another resistor $R_3$ is connected in series with the plate of diode $D_3$, and still another resistor $R_4$ is connected in series with the cathode of diode $D_4$. The remaining ends of resistors $R_1$ and $R_3$ are connected together at point 16; and likewise, the remaining ends of resistors $R_2$ and $R_4$ are connected together at point 17.

The series circuit, comprising components $R_1$, $D_1$, $D_2$, and $R_2$, will be designated as first-series circuit $S_1$ and is connected in parallel with a second-series circuit $S_2$ comprising components $R_3$, $D_3$, $D_4$ and $R_4$. The resistors $R_1$, $R_2$, $R_3$ and $R_4$ are equal in the described form of the invention.

A potentiometer $R_b$ is connected between points 16 and 17; and a charging capacitor $C_1$ is connected between ground and the tap 18 of resistor $R_b$.

A commutating voltage source 19 provides the switching voltage for the invention and connects to the primary 21 of a transformer 22. The secondary 23 of transformer 22 is connected to the ends of potentiometer $R_b$ and provides the switching voltage for the diodes. The commutating voltage may be a sinusoidal or square-wave voltage having a very large amplitude and is used to switch the diodes in accordance with the requirements of this invention. Transformer 22 is an isolation transformer and its turns ratio may be used to control the amplitude of the commutating voltage applied to series circuits $S_1$ and $S_2$. If transformer secondary 23 may be accurately centertapped, balancing potentiometer $R_b$ may be eliminated, and capacitor $C_1$ connected instead to the transformer centertap. However, if the commutating source voltage 19 is balanced with respect to ground and has the proper amplitude, it can be directly connected across potentiometer $R_b$, thereby eliminating transformer 22.

A signal is received at input terminals 26 and 27; and the signal may be either direct-current or alternating-current or a combination of both. If it is an alternating-current signal, it must have the same frequency as the commutating voltage and also must be properly phased with respect to the commutating voltage.

A resistor $R_5$ is connected between input terminal 26 and point N. The other input terminal 27 is grounded. The output of the filter circuit is received at output terminals 28 and 29. A resistor $R_6$ is connected across output terminals 28 and 29, and a second charging capacitor $C_2$ is connected between point P and output terminal 28. The other terminal 29 is grounded.

Resistors $R_5$ and $R_6$ will each be much greater in value than resistors $R_1$, $R_2$, $R_3$, $R_4$ and potentiometer $R_b$.

The signal output will be a pulsating direct-voltage, wherein the pulse-repetition rate is equal to the frequency of the comutating voltage. The amplitude of the output pulses will be a function of the rate-of-change of the envelope of the input signal; and, accordingly, no output signal is provided while the input signal remains at a constant steady-state amplitude.

Figure 2 shows an electro-mechanical switch 31 substituted for the electronic switch of Figure 1. The remaining components in Figure 2 are identical to those similarly identified in Figure 1. Electro-mechanical switch 31, which is sometimes called a chopper, has double-throw contacts 32 and 33 and a single pole 34, that is actuated by commutating voltage source 19 received on a relay coil 36. Thus, pole 34 vibrates at the frequency of the commutating voltage and first engages switch contact 32 for a period of time $T_1$, and then moves to the other switch contact 33 for an equal period of time $T_2$, and so on.

The operation of the invention in Figure 1 may be better understood after an understanding is obtained of the operation of the circuit in Figure 2. Assume that a constant amplitude alternating-voltage is suddenly applied to input terminals 26 and 27 in Figure 2 and is in phase with the actuations of pole 34. When pole 34 engages first contact 32, a positive one-half cycle of alternating input signal will charge capacitor $C_1$ at a rather slow rate, because resistor $R_5$ and capacitor $C_1$, when connected in series, have a relatively long time-constant. The following half-cycle of commutating voltage switches pole 34 over to the other contact 33 and connects capacitor $C_1$ in series with capacitor $C_2$ and resistor $R_6$, wherein capacitor $C_1$ discharges into capacitor $C_2$ at a slow rate, because of another long time-constant. The negative half-cycle of alternating input is open circuited and has no charging effect. It is only during the discharge of capacitor $C_1$ into capacitor $C_2$ that a current flows through output resistor $R_6$ to provide an output voltage.

It will be apparent, after a period of time, in which a constant alternating input signal is provided, that capacitor $C_1$ will be charged by positive half-cycles of input to a direct-voltage, which is very nearly the peak voltage of the steady-state input signal; and, accordingly, capacitor $C_2$ will charge to a constant value which also is very nearly peak value of the input voltage. After capacitors $C_1$ and $C_2$ acquire equal voltages, no discharge occurs between them, when pole 34 engages contact 33; and, accordingly, no current flows through output resistor $R_6$ to provide an output voltage. Therefore, the output voltage will remain zero during a period of steady-state signal input, after a short initial of output that accounts for the change in the input signal from zero value to the given steady-state value.

Where the envelope of the input signal is changing at a constant rate, such as voltage $V_{in}$ in Figure 4, the output will have constant amplitude pulses, such as pulses $V_{out}$ in Figure 5.

The circuit acts as a very narrow bandpass filter. When an alternating input is used, the center of the bandpass is the commutating voltage frequency, which might be 400 cycles per second; and the bandpass may be a fraction of a cycle per second. The phase between the alternating input signal and the commutating voltage is preferably either in-phase or 180 degrees out-of-phase but a small variation from these values will generally not cause difficulty, because the circuit output is a maximum at these values and decreases with the cosine of the phase angle. The output has zero amplitude at a ninety-degree phase angle and, therefore, rejects undesirable quadrature components in the input signal.

The input, output, and capacitor charging and discharging relationships in Figure 1 are similar to those described in connection with Figure 2. The electronic switching circuit in Figure 1 also is actuated by the commutating voltage to connect capacitor $C_1$ alternately in series with input point N and output point P. The switching operation may be explained by assuming that the instantaneous polarity of the commutating voltage is that shown in Figure 1, which lasts for one-half cycle; and thus, for the one-half cycle, the diodes $D_1$ and $D_2$ of circuit $S_1$ are biased to a conducting state, and they provide a "closed-circuit" between input terminal N and capacitor $C_1$. As a result, the input signal charges capacitor $C_1$ through parallel paths provided by diodes $D_1$ and $D_2$ from point N to tap 18.

The signal current is superimposed on the electron streams in conducting tubes $D_1$ and $D_2$ and charges capacitor $C_1$ because of the difference in voltage between point N and the grounded terminal of capacitor $C_1$. However, the commutating voltage does not substantially affect the charging operation of capacitor $C_1$, because tap 18 is adjusted to a balancing point on potentiometer $R_b$ where no commutating voltage appears between point N and tap 18 during any part of the commutating cycle. Accordingly, only the input signal can provide a voltage between point N and tap 18.

During the one-half cycle of commutating voltage having the polarity indicated in Figure 1, diodes $D_3$ and $D_4$ are non-conducting and provide an "open-circuit" between capacitors $C_1$ and $C_2$. Approximately one-half of the commutating voltage appears across each of the diodes $D_3$ and $D_4$, and they are biased far beyond the contact-potential region to a bias that provides very large impedances. Therefore, no conduction can occur from point P to either point N or to capacitor $C_1$. Also, none of the charge on capacitor $C_1$ can flow, at this time, to capacitor $C_2$ through either of the diodes $D_3$ and $D_4$.

When the next half-cycle of commutating voltage occurs, the indicated polarity in Figure 1 is reversed; and circuit $S_1$ becomes non-conducting, while circuit $S_2$ becomes conducting. Consequently, capacitor $C_1$ is connected to capacitor $C_2$ through parallel paths provided from tap 18 to point P through diodes $D_3$ and $D_4$, respectively. Thus, capacitor $C_1$ can discharge into capacitor $C_2$, as occurs in Figure 2 when pole 34 engages contact 33. Also, the input signal is, at this time, isolated from both capacitors $C_1$ and $C_2$ through the extremely high "open-circuit" impedances of diodes $D_1$ and $D_2$.

The variation of bias, caused by the commutating voltage on any of the diodes, is shown in Figure 6. It is noted that only a small-positive-biasing voltage is provided to maintain the diode plate current well below a safe limit, which greatly increases the life of the diodes.

It is further noted that the negative-biasing voltage is very large so that it sweeps through the contact-potential range almost instantaneously to maintain the diode in a very high impedance "open-circuit" state for substantially 180 degrees of each commutating voltage cycle.

The large difference in positive and negative bias is caused by resistors $R_1$, $R_2$, $R_3$, and $R_4$. During positive bias of either series circuit $S_1$ or $S_2$, a large voltage drop occurs across the series-connected resistors associated with the positively biased diodes to provide only a small part of the large commutating voltage as positive bias on the diodes. However, during negative bias, the extremely high "open-circuit" impedance of the diodes greatly exceeds the impedances of their series resistors, resulting in approximately one-half of the commutating voltage negatively biasing each diode to provide a large negative bias.

The invention will not operate properly if resistors $R_1$, $R_2$, $R_3$ and $R_4$ are left out of the circuit of Figure 1, because then the entire commutating voltage will appear as positive bias across each pair of series diodes, resulting in undue injection of commutating-voltage noise into the output signal and short tube life. In such case, the commutating voltage would have to be reduced to a small value; and as a result, during the negative cycle, the negative bias across the diodes may not be beyond the cut-off voltage shown in Figure 3. Therefore, conduction would exist due to the contact-potential to prevent a high "open-circuit" impedance. Also, if the negative bias does go slightly beyond the cut-off voltage the "open-circuit" switching time will be much smaller than the "closed-circuit" switching time.

Furthermore, if the negative bias is small and goes slightly beyond the contact-potential region, a very undesirable thing occurs: The filter circuit input and output are connected together during the period that any of the tubes are biased within the contact-potential region, because all four diodes are then conducting. This undesired connection is illustrated in Figure 2 by equivalent impedance $Z_d$.

The resistors $R_1$, $R_2$, $R_3$ and $R_4$ avoid the above described situation by making the biasing voltage have almost zero duration through the contact-potential range, as may be seen in Figure 6, where the diode-bias-voltage curve 38 is almost vertical through the contact-potential region, wherein there is almost no time component.

It is, therefore, apparent that the invention provides an electronically switched filter circuit that avoids difficulties with electron tube contact-potential and which maintains the very high "open-circuit" impedance required for proper filter circuit operation.

While a particular form of the invention has been shown and described, it is to be understood that the invention is capable of many modifications. Changes, therefore, in the construction and arrangement may be made without departing from the full scope of the invention as given by the appended claims.

What is claimed is:

1. An electronically switched filter circuit comprising four asymmetric conductors each capable of providing a large open-circuit impedance within a given range of negative-bias voltage, commutating voltage means for providing an alternating voltage having peak values within said range of negative bias voltage; a first series circuit connected across said commutating voltage means and including, a first pair of resistors connected in series with two of said asymmetric conductors; a second series circuit also connected across said commutating voltage means and including, a second pair of resistors connected in series with the remaining two of said asymmetric conductors; the asymmetric conductors of said second series circuit connected with opposite polarity from the asymmetric conductors of said first series circuit with respect to the commutating voltage, impedance means having a balancing tap and relatively low direct-current resistance connected across both of said series circuits, a first charging capacitor connected between ground and the balancing tap on said impedance means, input resistance means having one end connected to an intermediate point on said first series circuit between its asymmetric conductors and between its resistors; and an output circuit comprising, a second charging capacitor, and a resistance means connected in series, said output circuit connected at one end to a point on said second series circuit between its asymmetric conductors and between its resistors and connected at its other end to ground, wherein an input signal may be received between ground and the remaining end of said input resistance means.

2. An electronically switched filter circuit comprising a first series circuit including, a first resistor, a first diode, a second diode, and a second resistor; a second series circuit including a third resistor, a third diode, a fourth diode, and a fourth resistor; commutating voltage means balanced with respect to ground and connected across each of said series circuits, the diodes of said first series circuit connected with opposite polarity from the diodes of said second series circuit with respect to said commutating voltage means, the amplitude of the commutating voltage being optimum for obtaining high open-circuit impedances for said diodes, resistance means having a balanced tap and connected across said commutating voltage means, a first charging capacitor connected between ground and the tap of said resistance means, an input resistor having large resistance connected at one end to a point on said first series circuit between its diodes and between its resistors, a second charging capacitor connected on one side to a point between the diodes and between the resistors of said second series circuit, and an output resistor connected between the other side of said second charging capacitor and ground, wherein an input signal with an alternating component having the same frequency as the commutating voltage is provided between the remaining end of said input resistor and ground, and an output signal is taken across the output resistor and varies with the rate-of-change of the input signal.

3. An electronically switched filter circuit for providing an output signal which varies with the slow rate-of-change of an input signal, comprising a transformer having a primary and a secondary, a potentiometer having a balancing tap connected across the secondary, a first charging capacitor connected between ground and the balancing tap of said potentiometer; a first series circuit including, a first resistor, a first vacuum diode, a second vacuum diode, and a second resistor respectively connected across said secondary; an input resistor having a high resistance with one end connected to said first series circuit between its diodes; a second series circuit including, a third resistor, a third vacuum diode, a fourth vacuum diode, and a fourth resistor respectively connected across said secondary; the diodes of said first series circuit connected with opposite polarity from the diodes of said second series circuit with respect to said secondary, the peak portions of the commutating voltage provided by said secondary greatly exceeding the contact-potential range of said diodes, a second charging capacitor having one side connected between said third and fourth diodes, an output resistor connected between ground and the other side of said second charging capacitor, wherein the input signal is provided between the remaining end of said input resistor and ground; and the output signal is taken across said output resistor.

References Cited in the file of this patent

UNITED STATES PATENTS

| | | |
|---|---|---|
| 2,438,947 | Rieke et al. | Apr. 6, 1948 |
| 2,443,195 | Pensyl | June 15, 1948 |
| 2,700,763 | Foin | Jan. 25, 1955 |